(12) United States Patent
Almaguer

(10) Patent No.: US 6,508,307 B1
(45) Date of Patent: Jan. 21, 2003

(54) TECHNIQUES FOR HYDRAULIC FRACTURING COMBINING ORIENTED PERFORATING AND LOW VISCOSITY FLUIDS

(75) Inventor: James S. Almaguer, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/614,304

(22) Filed: Jul. 12, 2000

Related U.S. Application Data

(60) Provisional application No. 60/145,000, filed on Jul. 22, 1999.

(51) Int. Cl.$^7$ .............................................. E21B 43/26
(52) U.S. Cl. ...................................... 166/308; 166/297
(58) Field of Search ................................. 166/308, 297, 166/298, 300, 55

(56) References Cited

U.S. PATENT DOCUMENTS

| | | | |
|---|---|---|---|
| 4,790,958 A | 12/1988 | Teot ............................. | 507/237 |
| 5,010,964 A | 4/1991 | Cornette ...................... | 175/4.51 |
| 5,074,359 A | 12/1991 | Schmidt ...................... | 166/280 |
| 5,258,137 A | 11/1993 | Bonekamp et al. .......... | 252/356 |
| 5,259,466 A | 11/1993 | Venditto et al. ............. | 175/4.51 |
| 5,318,123 A | 6/1994 | Venditto et al. ............. | 166/250 |
| 5,330,005 A | 7/1994 | Card et al. ................... | 166/280 |
| 5,335,724 A | 8/1994 | Venditto et al. ............. | 166/298 |
| 5,386,875 A | 2/1995 | Venditto et al. ............. | 166/308 |
| 5,443,119 A | 8/1995 | Chambers et al. ........... | 166/254 |
| 5,551,516 A | 9/1996 | Norman et al. .............. | 166/308 |
| 5,782,300 A | 7/1998 | James et al. ................. | 166/278 |
| 5,964,295 A | 10/1999 | Brown et al. ................ | 166/308 |
| 5,979,557 A | 11/1999 | Card et al. ................... | 166/300 |
| 6,135,205 A | 10/2000 | Phillips ....................... | 166/297 |
| 6,140,277 A | 10/2000 | Tibbles et al. .............. | 507/201 |
| 6,173,773 B1 * | 1/2001 | Almaguer et al. ........ | 166/255.2 |

FOREIGN PATENT DOCUMENTS

| | | | |
|---|---|---|---|
| EP | 0602980 A2 | 6/1994 | ......... E21B/43/119 |
| EP | 0602980 A3 | 4/1995 | ......... E21B/43/119 |

OTHER PUBLICATIONS

R. G. van de Ketterij and C. J. de Pater, "Impact of Perforations on Hydraulic Fracture Tortuosity", SPE Prod. & Facilities 14(2), 131 (1999) (SPE 56193).
M. Samuel et al., "Polymer–Free Fluids for Hydraulic Fracturing", SPE 38622 (1997).
H.H. Abass, et al., "Oriented Perforations: A Rock Mechanics View", SPE 28555 (1994).
C. H. Yew et al., "On Fracture Design of Deviated Wells", SPE 19722 (1989).
C. H. Yew and Y. Li, "Fracturing of a Deviated Well", SPE 16930 (1987).

* cited by examiner

Primary Examiner—David Bagnell
Assistant Examiner—Jennifer Dougherty
(74) Attorney, Agent, or Firm—Catherine Menes; Doug Y'Barbo; Brigitte Jeffery

(57) ABSTRACT

The present invention relates to novel methods to stimulate a hydrocarbon-bearing formation; in particular, techniques are disclosed for shooting perforations aligned with the direction of probable fracture propagation; this is followed by fracturing using a low viscosity fluid, preferably a viscoelastic surfactant-based fluid; the combination yields surprising results with respect to optimized fracture efficiency (i.e., ideal height, and half-length more closely approaches the true fracture length due to superior clean up properties of the fluids).

20 Claims, 5 Drawing Sheets

TECHNIQUES FOR HYDRAULIC FRACTURING COMBINING ORIENTED PERFORATING AND LOW VISCOSITY FLUIDS

This patent application is a non-provisional application based on U.S. Provisional Application No. 60/145,000, filed Jul. 22, 1999.

BACKGROUND OF THE INVENTION

1. Technical Field of the Invention

The present Invention relates to techniques for stimulating the production of oil and gas from a reservoir. In particular, the present Invention relates to specialized techniques of propped hydraulic fracturing, in which the perforations are shot in a plane aligned with the direction of probable fracture propagation, thereafter the fracturing treatment is performed using a low viscosity fluid.

2. Introduction to the Technology

The present Invention relates generally to hydrocarbon (petroleum and natural gas) production from wells drilled in the earth. Obviously, it is desirable to maximize both the rate of flow and the overall capacity of hydrocarbon from the subsurface formation to the surface, where it can be recovered. One set of techniques to do this is referred to as stimulation techniques, and one such technique, "hydraulic fracturing," is the subject of the present Invention. The rate of flow, or "production" of hydrocarbon from a geologic formation is naturally dependent on numerous factors. One of these factors is the radius of the borehole; as the bore radius increases, the production rate increases, everything else being equal. Another, related to the first, is the flowpaths from the formation to the borehole available to the migrating hydrocarbon.

Drilling a hole in the subsurface is expensive—which limits the number of wells that can be economically drilled—and this expense only generally increases as the size of the hole increases. Additionally, a larger hole creates greater instability to the geologic formation, thus increasing the chances that the formation will shift around the wellbore and therefore damage the wellbore (and at worse collapse). So, while a larger borehole will, in theory, increase hydrocarbon production, it is impractical, and there is a significant downside. Yet, a fracture or large crack within the producing zone of the geologic formation, originating from and radiating out from the wellbore, can actually increase the "effective" (as opposed to "actual") wellbore radius, thus, the well behaves (in terms of production rate) as if the entire wellbore radius were much larger.

Fracturing (generally speaking, there are two types, acid fracturing and propped fracturing, the latter is of primary interest here) thus refers to methods used to stimulate the production of fluids resident in the subsurface, e.g., oil, natural gas, and brines. Hydraulic fracturing involves literally breaking or fracturing a portion of the surrounding strata, by injecting a specialized fluid into the wellbore directed at the face of the geologic formation at pressures sufficient to initiate and extend a fracture in the formation. More particularly, a fluid is injected through a wellbore; the fluid exits through holes (perforations in the well casing lining the borehole) and is directed against the face of the formation (sometimes wells are completed openhole where no casing and therefore no perforations exist so the fluid is injected through the wellbore and directly to the formation face) at a pressure and flow rate sufficient to overcome the minimum in-situ rock stress (also known as minimum principal stress) and to initiate and/or extend a fracture(s) into the formation. Actually, what is created by this process is not always a single fracture, but a fracture zone, i.e., a zone having multiple fractures, or cracks in the formation, through which hydrocarbon can flow to the wellbore.

In practice, fracturing a well is a highly complex operation performed with precise and exquisite orchestration of equipment, highly skilled engineers and technicians, and powerful integrated computers monitoring rates, pressures, volumes, etc. During a typical fracturing job, large quantities of materials often in excess of a quarter of a million gallons of fluid, will be pumped at high pressures exceeding the minimum principal stress down a well to a location often thousands of feet below the surface.

Thus, once the well has been drilled, fractures are often deliberately introduced in the formation, as a means of stimulating production, by increasing the effective wellbore radius. Clearly then, the longer the fracture, the greater the effective wellbore radius. More precisely, wells that have been hydraulically fractured exhibit both radial flow around the wellbore (conventional) and linear flow from the hydrocarbon-bearing formation to the fracture, and further linear flow along the fracture to the wellbore. Therefore, hydraulic fracturing is a common means to stimulate hydrocarbon production in low permeability formations. In addition, fracturing has also been used to stimulate production in high permeability formations. Obviously, if fracturing is desirable in a particular instance, then it is also desirable, generally speaking, to create as large (i.e., long) a fracture zone as possible—e.g., a larger fracture means an enlarged flowpaths from the hydrocarbon migrating towards the wellbore and to the surface.

The Prior Art

The present Invention combines disparate technologies from the prior art, which when combined, produce unexpectedly superior results—as evidenced by results obtained in an actual field setting, which shall be discussed later.

The prior art upon which the present Invention is based is the general teaching of the shooting perforations oriented in the direction in which the fracture is most likely to propagate. This way, potentially large pressure drops caused by the tortuous flowpath that the fluid must take, are eliminated, in turn allowing the well operator to perform fracture treatments. (See, e.g., H. H. Abass, et al., Oriented Perforations: A Rock Mechanics View, SPE 28555 (1994); C. H. Yew and Y. Li, Fracturing of A Deviated Well, SPE 16930 (1987), both papers are hereby incorporated by reference in their entirety).

A second major area of prior art subsumed in the present Invention is low viscosity fracturing fluids. In particular, such low viscosity fracturing fluids include water and viscoelastic surfactant-based fracturing fluids. (See, e.g., U.S. Pat. No. 5,551,516, Hydraulic Fracturing Process and Compositions, assigned to Schlumberger). These unique viscoelastic surfactant-based fracturing fluids shall be described in more detail later.

SUMMARY OF THE INVENTION

The novelty of the present Invention resides in the combination of the steps of properly orienting perforations in a well casing relative to pre-determined stress fields, so that the perforations are aligned in the direction of likely fracture propagation plus the step of creating a propped fracture by means of a low viscosity fracturing fluid.

Preferred embodiments of the present Invention are directed to fracturing treatments in very tight gas-producing formations, and in particular, those having very high stress contrasts between the producing zones and the bounding layers.

The present Invention possesses numerous very significant advantages over the prior art. These shall be explained below.

A fracture will propagate in the direction perpendicular to the formation's minimum in situ stress. If the perforations are not oriented in that direction, the fracturing fluid does not take the most direct route into the fracture. Instead, the fluid exits the perforation (under tremendous pressure) and begins to fracture the formation directly opposite the perforation. Eventually, the fluid is redirected towards in the direction of maximum in situ stress (i.e., the path of least resistance); it is in this direction that the major fracture eventually propagates. Hence, the fluid—rather than travelling in the most direct route (from the perforation directly into the formation) takes a more tortuous route into the formation. This effect—often referred to as "near-wellbore tortuosity"—is highly undesirable. (It is also well documented in the literature, see, e.g., R. G. van de Ketterij and C. J. de Pater, *Impact of Perforations on Hydraulic Fracture Tortuosity*, 14(2) SPE Prod. & Facilities 131 (1999). The reason is that near-wellbore tortuosity leads to often large pressure losses—in other words, as the fluid is redirected from its immediate exit to the direction in which it eventually travels, its pressure understandably decreases. In response to this adverse effect, the fluid must be initially pumped at higher pressures than are actually required (if the perforations had been optimally aligned). Higher pumping pressures require greater horsepower and therefore increase the cost of the treatment. Aside from higher pumping pressures, another response is to use a higher viscosity fluid (higher than is ordinarily needed to deliver the proppant). Yet higher viscosity fluids also require greater horsepower to pump, but more significantly, they are more damaging to the newly propped fracture because the fluid is difficult to remove from the placed proppant pack. And aside from this, higher viscosity fluids tend, on average, to be require additional breakers, thus further increasing the cost of the treatment.

Again, as we have stated, the primary advantage of properly oriented perforations is that it allows lower pumping pressures, thus increasing treatment cost. In addition though, this allows the use of lower viscosity fluids. In the present Application, we have found that particular types of low viscosity fluids when used in conjunction with precisely oriented perforations, give rise fractures of surprising effectiveness. By "effectiveness" we mean fractures of optimum height—substantial height yet still that do not reach the bounding (non-producing) layers; and optimum length. The enhanced length is due to the remarkable ability of the fluids of the present Invention to clean-up, or be removed from the fracture after the fluid has successfully delivered the proppant. As we shall demonstrate, the conventional polymer-based fluid, under the same conditions, would give rise to a fracture out of zone (based on computer modeling results).

DETAILED DESCRIPTION OF THE PREFERRED EMBODIMENTS

The present Invention is particularly applicable in reservoirs that meet certain criteria, in particular: very low permeability (typically gas) and high stress contrasts between the pay zone and the confining zones.

A principal benefit of the present Invention is that in tight gas wells, the well operator can attain a more effective fracture. By "more effective" we mean that the fracture height is controlled so that it is confined to the pay zone, and also that the fracture length is maximized. By maximizing fracture length we are referring to the effective fracture length, which is nearly always diminished in polymer-based fluid treatments due to stagnant fluid which remains in the fracture tip, thus reducing the effective fracture length far below the true fracture length. The fluids of the present Invention exhibit far better "clean-up," i.e., they are more easily removed (flowed back) from the fracture. Therefore, fracture effectiveness is maximized—its height is carefully controlled so that does not break out of zone and the length is maximized due to superior fluid clean up.

The Preferred Perforation Orienting Systems

In the following description, numerous details are set forth to provide an understanding of the present invention; however, it will be understood by those skilled in the art that the present invention may be practiced without these details and that numerous variations or modifications from the described embodiments may be possible. For example, although reference is made to perforating strings in some embodiments, it is contemplated that other types of oriented downhole tool strings may be included in further embodiments. Some methods and apparatus for orienting downhole tool strings are presented in U.S. Pat. application Ser. No. 09/292,151, Orienting Downhole Tools, which is incorporated herein in its entirety.

Figure 1:
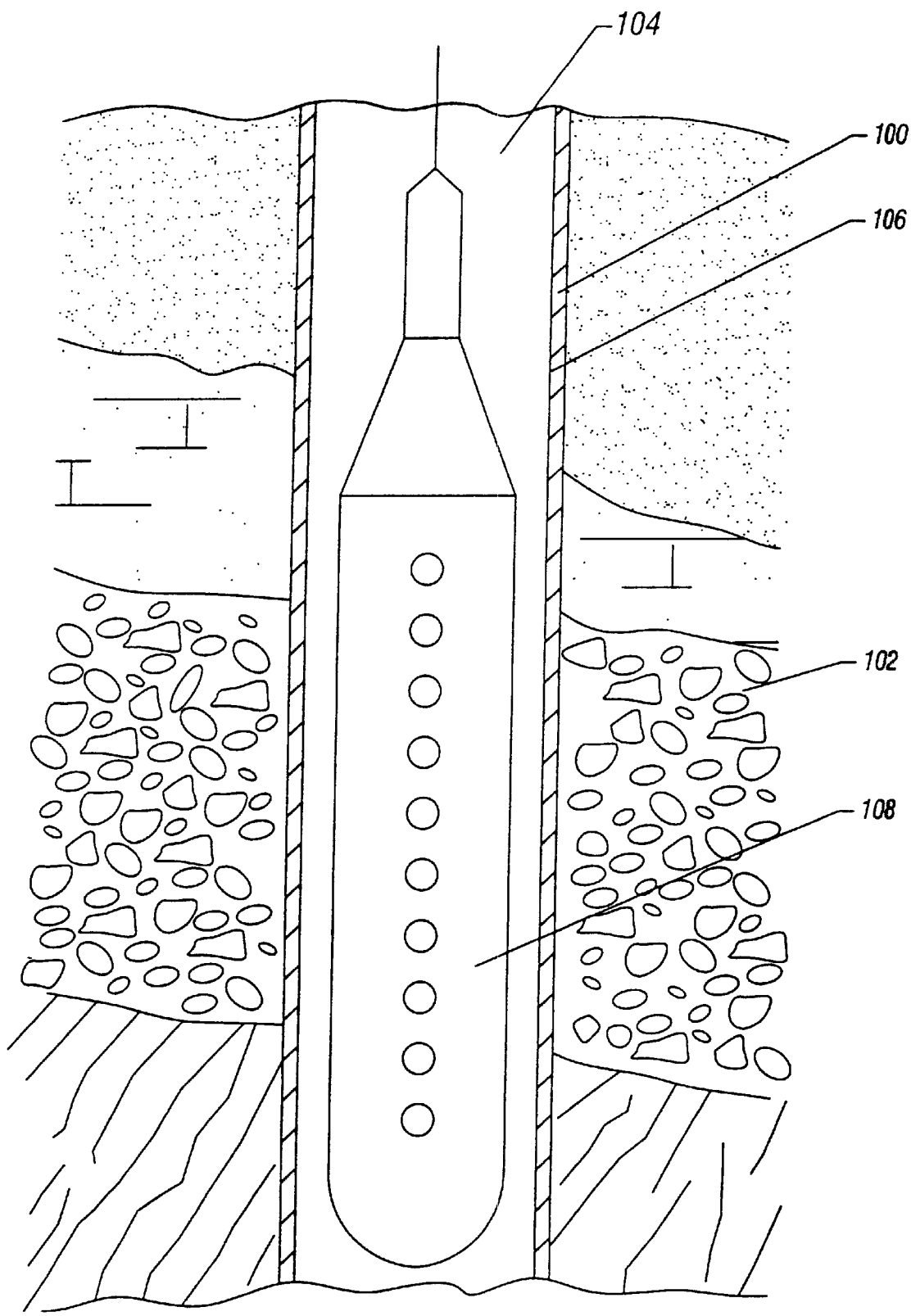
FIG. 1 is a diagram of an embodiment of a tool string positioned in a cased wellbore.

Referring to FIG. 1, a formation zone 102 having producible fluids is adjacent a wellbore 104 lined with casing 100. The location of the formation zone 102 and its stress characteristics (including the minimum and maximum stress planes) may be identified using any number of techniques, including open hole (OH) logging, dipole sonic imaging (DSI), ultrasonic borehole imaging (UBI), vertical seismic profiling (VSP), formation micro-imaging (FMI), or the Snider/Halco injection method (in which tracers are pumped into the formation 102 and a measurement tool is used to detect radioactivity to identify producible fluids).

Such logging techniques can measure the permeability of the formation 102. Based on such measurements, the depth of a zone containing producible fluids can be determined. Also, the desired or preferred fracture plane in the formation 102 can also be determined. The preferred fracture plane may be generally in the direction of maximum horizontal stresses in the formation 102; however, we contemplate that a desired fracture plane may also be aligned at some predetermined angle with respect to the minimum or maximum stress plane. Once a desired fracture plane is known, oriented perforating equipment 108 may be lowered into the wellbore to create perforations that are aligned with the desired plane.

In another embodiment, oriented perforating may also be used to minimize sand production in weak formations. In addition, oriented perforating may be used to shoot away from other downhole equipment to prevent damage to the equipment, such as electrical cables, fiber optic lines, submersible pump cables, adjacent production tubing or injection pipe, and so forth. Oriented perforating may also be practiced for doing directional squeeze jobs. If the current surrounding the pipe contains a void channel, the direction of that channel can be determined using a variety of methods and tools such as the USIT (Ultrasonic Imaging Tool). Once the direction is known, oriented perforating may be executed accordingly. Further embodiments may include oriented downhole tools for other operations. For example, other downhole tools may perform oriented core sampling for formation analysis and for verification of a core's direction, for setting wireline-conveyed whipstocks, and for other operations.

With a vertical or near vertical wellbore 104 having a shallow angle of trajectory (e.g., less than about 10°), it may be difficult to use the force of gravity to adjust the azimuthal orientation of a perforating gun string or other tool string carried by a non-rigid carrier (e.g., wireline or slick line) from the surface. According to some embodiments of the invention, an oriented perforating string includes an orienting mechanism to orient the perforating string in a desired azimuthal direction. It is contemplated that some embodiments of the invention may also be used in inclined wellbores.

Several different embodiments of oriented perforating equipment are described below. In a first embodiment, a "natural orientation" technique is employed that is based on the principle that the path of travel and position of a given tool string (or of substantially similar strings) within a given section of a well is generally repeatable provided that steering effects from the cable (e.g., cable torque) are sufficiently eliminated (e.g., by using a cable swivel). It may also be necessary to keep most operational and tool conditions generally constant. Such conditions may include the following, for example: components in the tool string; length of tool string; method of positioning (e.g., lowering and raising) the tool string; and so forth. Thus, in the natural orientation technique, a first orientation string including a positioning device may be run in which a measurement device can determine the position and orientation of the string after it has reached its destination. The positioning device in one embodiment may be a mechanical device (e.g., including centralizing or eccentralizing arms, springs, or other components). In another embodiment, the positioning device may be an electrical or magnetic device. Once the natural orientation of the tool string is determined based on the first trip, the tool's angular position may be adjusted (rotated) at the well surface to the desired position. A second run with a tool string including a positioning device is then performed by lowering the tool string into the wellbore, which tends to follow generally the same path.

In a variation of this embodiment, it may be assumed that in wells that have sufficient inclination (e.g., perhaps about 20° or more), the positioning device will position the tool string at some relationship with respect to the high or low side of a wellbore once the tool string has been lowered to a predetermined depth. An oriented device in the tool string may then be angularly aligned at the surface before lowering into the wellbore so that the oriented device is at substantially a desired orientation once it is lowered to a given wellbore interval. In this variation, one run instead of two runs may be used.

In other embodiments, a motorized oriented tool string includes a motor and one or more orientation devices lowered into the wellbore, with the tool rotated to the desired azimuthal or gravitational orientation by the motor based on measurements made by the orientation devices.

Figures 2A, 2B:
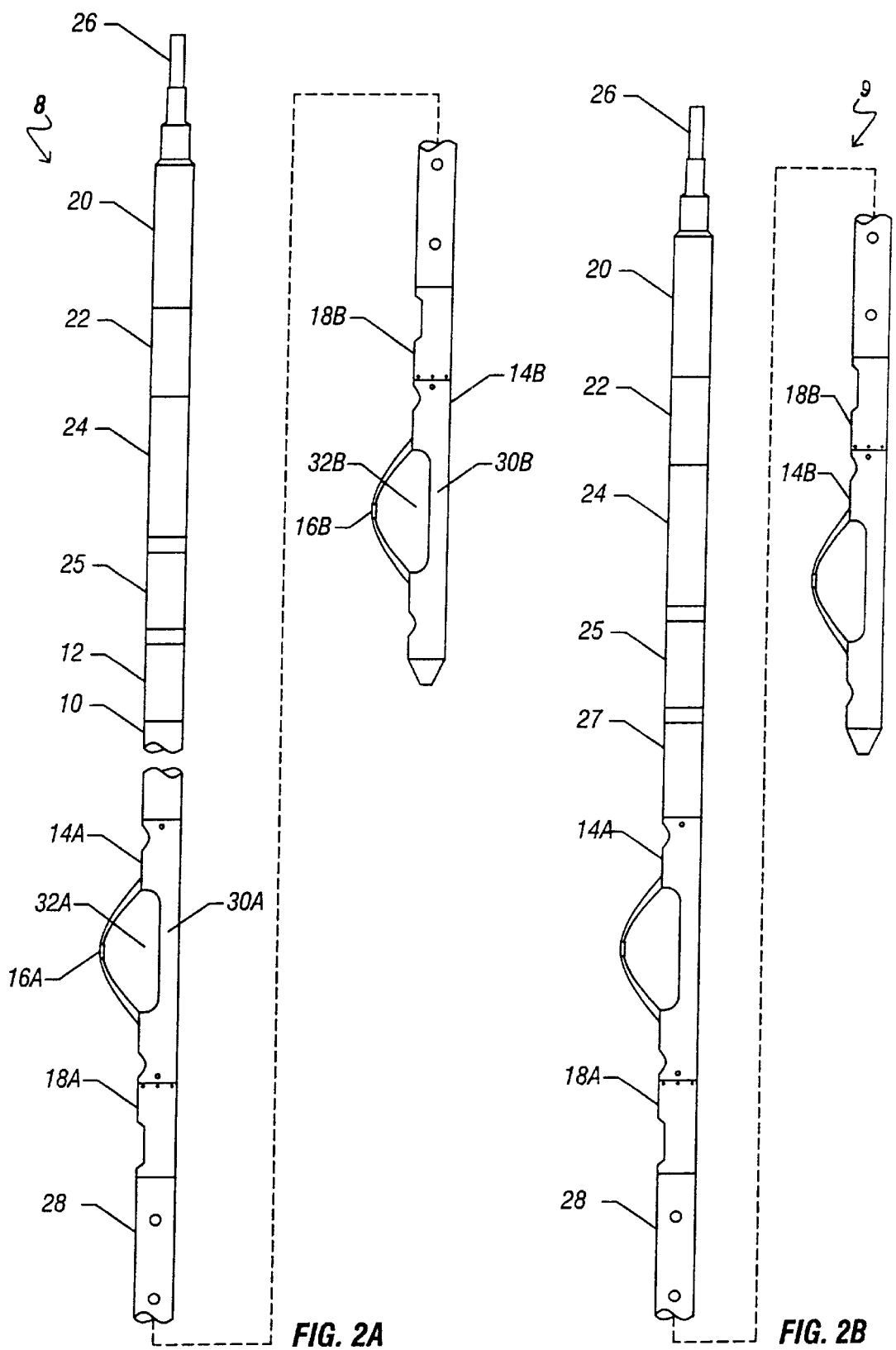
FIG. 2 (2A and 2B) are diagrams of tool strings according to one embodiment used to perform natural orientation.

Referring to FIGS. 2A–2B, tools for performing natural orientation of downhole equipment (such as a perforating string) are shown. In one embodiment, natural orientation involves two runs into the wellbore 104. In another embodiment, natural orientation may involve one run into the wellbore. In the embodiment involving two runs, a first run includes lowering an orientation string 8 (FIG. 2A) into the wellbore to measure the orientation of the string 8. Once the orientation of the tool string 8 is determined based on the first trip, the angular position of device 28 may be adjusted (rotated) with respect to the tool string 8 at the well surface to the desired position.

Next, a tool string 9 (FIG. 2B), which may be a perforating string, for example, is lowered downhole that follows substantially the same path as the orientation string 8 so that the tool string 9 ends up in substantially the same azimuthal position as the orientation string 8. Thus, the first trip is used for determining the natural orientation of the tool string 8 after it has reached a given interval (depth), while the second trip is for performing the intended operation (e.g., perforating) in that interval after the tool string 9 has been lowered to the given interval and positioned in substantially the same natural orientation.

On the first trip, a gyroscope device 10 may be included in the string 8 to measure the azimuthal orientation of the string in the wellbore interval of interest. An inclinometer tool 25 which can be used for providing the relative bearing of the orientation string 8 relative to the high side of the wellbore may also be included in the string. A few passes with the orientation string 8 can be made, with the relative bearing and azimuthal orientation information measured and stored in a log. Each pass may include lowering and raising the orientation tool string 8 one or more times. The tool positions for the up and down movements in a pass may be different. The direction (up or down) in which better repeatability may be achieved can be selected for positioning the tool.

The orientation string 8 and the tool string 9 are designed to include as many as the same components as possible so that the two strings will substantially follow the same path downhole in the wellbore. On the second trip, the gyroscope device 10 may be removed from the string 9, but the remaining components may remain the same. Next, the device (e.g., a perforating gun 28) in the tool string 9 for performing the desired operation is oriented, at the surface, to place the device at an angular position with respect to the rest of the string 8 based on the natural orientation determined in the first trip. Any special preparation such as arming guns may also be performed prior to re-entering the well for the second trip. The inclinometer tool 25 may remain in the tool string 9 to measure the relative bearing of the tool string 9 to determine if tool string 9 is following generally the same path as the orientation string 8.

Removal of the gyroscope device 10 is performed to reduce likelihood of damage to the gyroscope. However, with a gyroscope that is capable of withstanding the shock associated with activating a perforating gun 28, the gyroscope device 10 may be left in the string 9. Further, in oriented downhole tools that do not perform perforation, the gyroscope may be left in the tool string as the shock associated with perforating operations do not exist.

The gyroscope device 10 in the orientation string 8 is used to identify the azimuthal orientation of the string 8 with respect to true north. In one example embodiment, the gyroscope device 10 may be coupled above a perforating gun 28. Weighted spring positioning devices (WSPD) 14A and 14B are coupled to the perforating gun 28 with indexing adapters 18A and 18B, respectively. The indexing adapters 18A and 18B may allow some degree (e.g., 5°) of indexing between the gun 28 and the rest of the tool string. Based on the desired orientation of the gun 28 with respect to the rest of the string, the gun 28 can be oriented by rotating the indexing adapters 18A and 18B to place the gun 28 at an angular position with respect to the rest of the string 9 so that the gun 28 is at a desired azimuth orientation once the string 9 reaches the target wellbore interval.

According to some embodiments, one or more WSPDs 14 are adapted to steer the string in a natural direction and to reduce the freedom of transverse movement of the orientation string 8 as it is lowered in the wellbore 104. The WSPD 14A is located above the gun 28 and the WSPD 14B is located below the gun 28.

In each WSPD 14, one side is made heavier than the other side by use of a segment with a narrowed section 30 and a gap 32. Thus, in a well having some deviation (e.g., above 1° deviation), the heavy side—the side with the narrowed section 30—of the WSPD 14 will seek the low side of the wellbore 104. Each WSPD 14 also has a spring 16 on one side that presses against the inner wall 106 of the casing 100 to push the other side of the WSPD 14 up against the casing 100. The WSPDs also reduce the freedom of movement of the orientation string 8 by preventing the orientation string 8 from freely rotating or moving transversely in the wellbore 104. The offset weights of the WSPDs 14A and 14B aid in biasing the position of the tool string 8 to the low side of the wellbore 104.

The inclinometer tool 25 includes an inclinometer sonde (such as a highly precise bi-axial inclinometer sonde) attached by an adapter 12 to the gyroscope device 10 below. The inclinometer tool 25 may also include a CCL (casing collar locator) that is used to correlate the depth of the orientation string 8 inside the casing 100. As the orientation string 8 is lowered downhole, the inclinometer sonde provides relative bearing information of the string 8 and the CCL provides data on the depth of the tool string 8. Such data may be communicated to and stored at the surface (or, alternatively, stored in some electronic storage device in the tool string 8) for later comparison with data collected by an inclinometer sonde in the gun string 9. If the relative bearing data of the orientation string 8 and the gun string 9 are about the same, then it can be verified that the gun string 9 is following substantially the same path as the orientation string 8.

Figure 7:
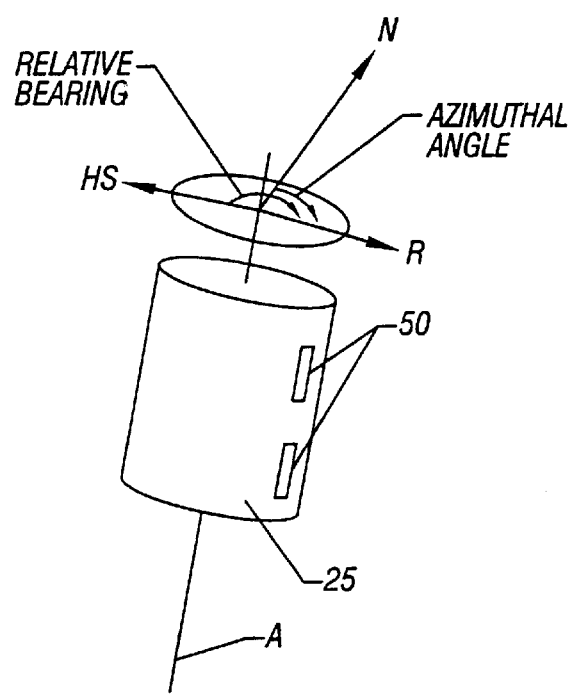
FIG. 7 illustrates relative bearing and azimuthal angles associated with a downhole tool.

Referring to FIG. 7, the azimuthal angle of the tool string 8 or 9 can be defined as the angle between north (N) and a reference (R) in the inclinometer tool 25. The relative bearing angle of each of the orientation string 8 and tool string 9 is measured clockwise from the high side (HS) of the wellbore 104 to the reference (R) in the inclinometer tool 25. In one embodiment, the reference (R) may be defined with respect to one or more longitudinal grooves 50 in the outer wall of the inclinometer tool 25. The positions of the sensor(s) in the inclinometer tool 25 are fixed (and known) with respect to the longitudinal grooves 50. Further, when the string 8 or 9 is put together, the position of the components of the string 8 or 9 in relation to the grooves 50 are also known.

The tool string 8 may be attached at the end of a non-rigid carrier 26 (e.g., a wireline or slick line). In one embodiment, to keep torque applied to the carrier 26 from swiveling the orientation string 8 as it is being lowered downhole, a swivel adapter 24 may be used. The carrier 26 is attached to the string 8 by a carrier head 20, which is connected by an adapter head 22 to the swivel adapter 24. The swivel adapter 24 in one example may be a multi-cable or a mono-cable adapter, which decouples the tool string 8 from the carrier 26 (torsionally). Thus, even if a torque is applied to the carrier 26, the orientation string 8 can rotate independently. Alternatively, the swivel adapter 24 can be omitted if the elasticity of the non-rigid carrier 26 allows the carrier to follow the tool string 8 as it is rotating in traversing the path downhole.

The orientation string 8 is lowered according to a predetermined procedure from the surface. The steps used in this procedure are substantially repeated in the second run of the natural orientation technique to achieve the same positioning in the second run. The orientation of the string 8 as it makes entry into the wellbore 104 is known. The equipment for lowering the string 8 is also known. As the orientation string 8 is lowered downhole, the string naturally positions itself in the hole. According to one procedure, the orientation string 8 is lowered downhole past the well interval defined by the formation zone 102. The orientation string 8 may then be raised back up to the interval and measurements taken using the gyroscope device 10 and inclinometer sonde and CCL 25 to determine the position of the orientation string 8. This procedure can be repeated several times with the orientation string 8 to ensure repeatability of orientation.

There may be cases where the orientation string 8 may not be able to go past the interval defined by the formation zone 102, such as when other equipment are located further below. In such cases, a modified procedure can be used, such as lowering the orientation string 8 into the interval, stopping, making the measurement, and then raising the string.

After measurements have been made, the orientation string 8 is raised out of the wellbore 104. At the surface, before the second run is made, the gyroscope device 10 may be removed. All other components can remain the same as those in the orientation string 8. Like components have the same reference numerals in FIGS. 2A and 2B.

In the tool string 9, the indexing heads 18A and 18B may be rotated to adjust the perforating gun 28 to point in the desired direction. The oriented tool string 9 is then lowered downhole following the same procedure used for the orientation string 8. Because the components of the two strings are substantially the same, the strings will tend to follow the same path. The inclinometer tool 25 (including the inclinometer sonde and CCL) in the gun string 9 can confirm if the string 9 is following about the same path as the orientation string 8. If the comparison of the relative bearing data indicates a sufficiently significant difference in the travel path, the gun string 9 may be pulled out, repositioned, and lowered back into the wellbore 104.

Further, if desired, additional components (such as a sub 27 in FIG. 2B) may be connected in the oriented tool string 9 to make it be about the same length as the orientation string 8. Tests have shown that repeatability of orientation of the strings is good. For example, in a slightly deviated well, such as an about 1° well, variation of about 7° in the orientation of the gun strings was observed over several runs. Any variation below ±10° may be considered acceptable.

In alternative embodiments, the order of the components in tool strings 8 and 9 may be varied. Further, some components may be omitted or substituted with other types of components. For example, the CCL may be part of the gyroscope device 10 instead of part of the inclinometer tool 25. In this alternative embodiment, when the gyroscope device 10 is taken out to form tool string 9, a CCL may be put in its place.

In a variation of the natural orientation embodiment, one run instead of two may be employed to perform oriented downhole operations. If a desired fracture plane or some other desired orientation of a downhole device is known beforehand, an oriented device (such as a perforating gun) may be angularly positioned with respect to the WSPDs 14 at the surface. The WSPDs 14 will likely guide the tool string to a given orientation with respect to the high side of the wellbore. Thus, when the tool string is lowered to the targeted wellbore interval, the oriented device in the tool string will be at the desired orientation. This may be confirmed using an inclinometer, for example.

Figure 5:
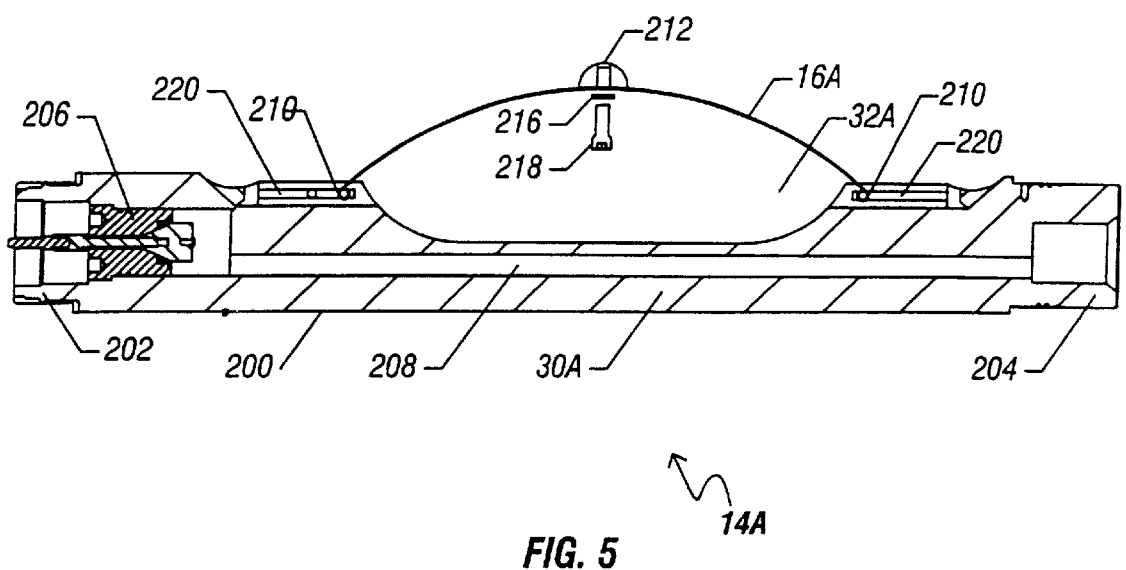
FIGS. 5 and 6 illustrate position devices in the tool strings of FIGS. 2A and 2B.

Referring to FIG. 5, a more detailed diagram of the upper WSPD 14A is illustrated. The housing 200 of the WSPD 14A has a threaded portion 202 at a first end and a threaded portion 204 at the other end to connect to adjacent components in the orientation or tool string 8 or 9. A connector 206 may be provided at the first end to receive electrical cables and to route the electrical cables inside the housing 200 of the WSPD 14A, such as through an inner bore 208.

As illustrated, the upper WSPD 14A includes a segment having the narrowed section 30A and the gap 32A. The eccentering spring 16A that is generally parabolically shaped is attached to one side of the housing 200 of the WSPD 14A. In one embodiment, the spring 16A may be attached to the housing 200 by dowel pins 210. In another embodiment, the spring 16A may be made with multiple layers. A wear button 212 may also be attached to the centering spring 16A generally at its apex. In one example embodiment, the wear button 212 may be attached to the eccentering spring 16A with a bolt 218 and a washer 216. The purpose of the wear button 212 is to protect the eccentering spring 16A from damage due to sliding contact with the inside of the casing 100. In further embodiments, the size of the wear button 212 may be increased or reduced.

A pair of tracks 220 are also defined in the housing 200 in which the dowel pins 210 are received. The dowel pins 210 are moveable in their respective tracks 220 to allow the spring 16A to be compressed toward the housing 200 of the WSPD 14A. Allowing the ends of the spring 16A to be spread along the tracks 220 due to compression as the orientation or tool string 8 or 9 is lowered downhole reduces the likelihood of deformation of the spring 16A.

Figure 6:
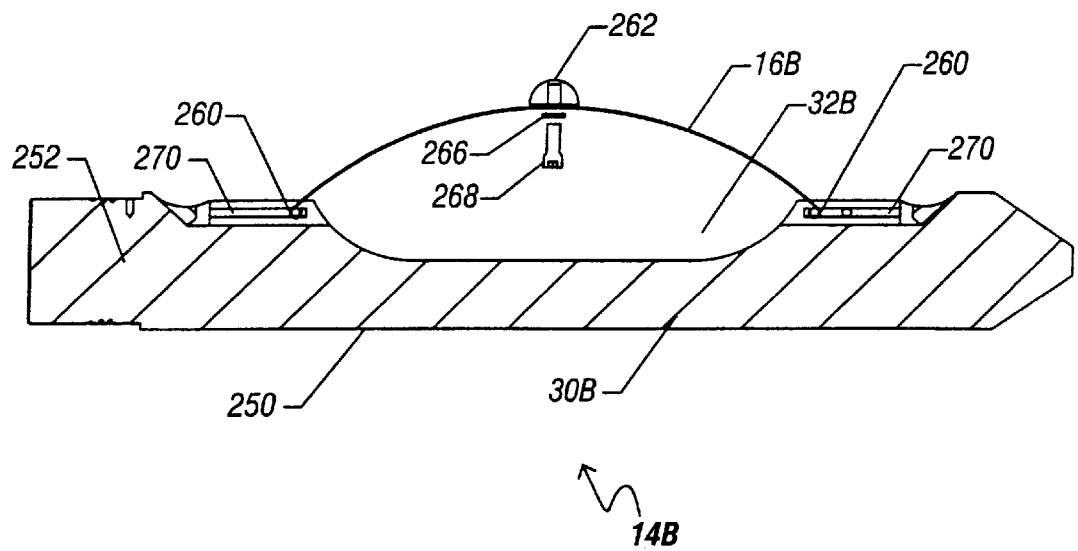

Referring to FIG. 6, the lower WSPD 14B is illustrated. The WSPD 14B includes a housing 250 having a threaded portion 252 at one end to connect to the rest of the orientation or tool string 8 or 9. The housing 250 includes segment having the narrowed section 30B and the gap 32B. The eccentering spring 16B is attached by dowel pins 260 to the housing 250 in side tracks 270. A wear button 262 may be attached to the eccentering spring 16B with a bolt 268 and a washer 266.

Figure 3:
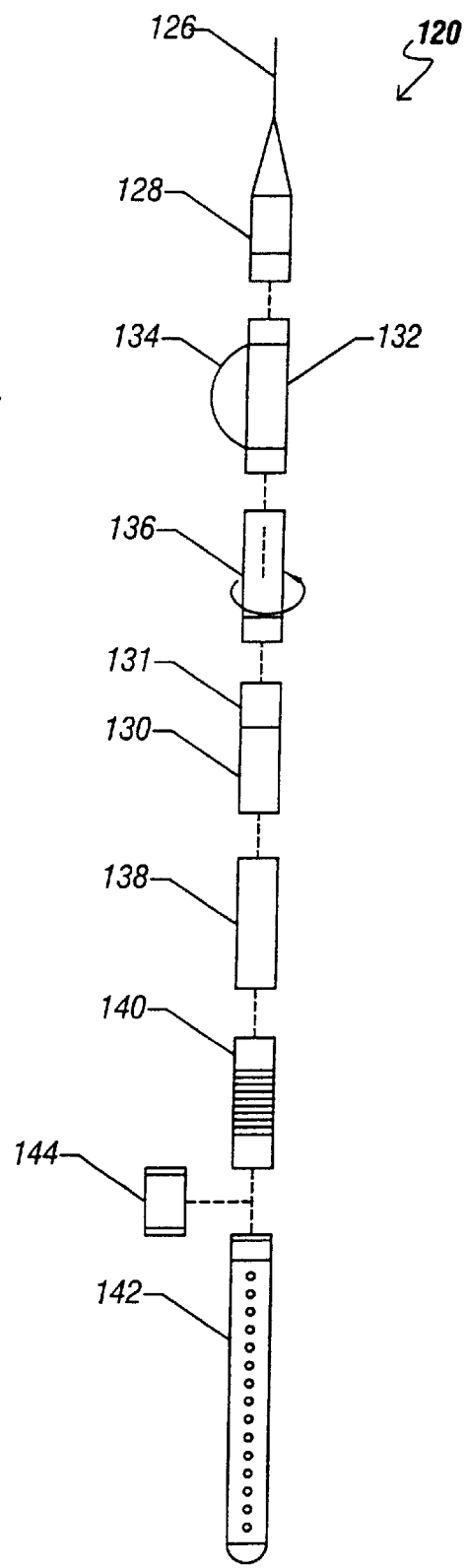
FIG. 3 is a diagram of a tool string according to another embodiment that includes an inclinometer sonde and a motor capable of rotating portions of the tool string.

Referring to FIG. 3, an oriented tool string 120 according to an alternative embodiment of the invention includes components for orienting the string 120 so that multiple runs into the wellbore 104 for orienting tool strings can be avoided. Thus, whereas the tool string 9 of FIG. 2B can be referred to as a passive orienting system, the string 120 shown in FIG. 3 can be referred to as an active system.

An adapter 128 attaches the string 120 to a carrier 126 (e.g., wireline, slick line, coiled tubing, and so forth). An anchor 132 is attached below the adapter 128. In addition, a motor 136 is attached under the anchor 132 that is controllable to rotate a downhole perforating gun 142, for example. The anchor 206 presses against the inner wall 106 of the casing 100 to anchor the tool string 120 while the gun 142 is rotated by the motor 136 with respect to the anchor 132.

A CCL 131 and electronics device 130 may be attached below the motor 136, with the CCL 131 measuring the depth of the string 120 and the electronics device 130 including various electronics circuitry, including circuitry for performing shot detection. An inclinometer sonde 138 is attached below the device 130. Measurements taken by the inclinometer sonde 138, CCL 131, and electronics device 130 may be transmitted to the surface as the tool string 120 is being located into the wellbore 104 to enable a surface operator to control the motor 136 to rotate the gun 142. Based on the data measured by the inclinometer sonde 138, the relative bearing of the tool string 120 can be derived. Based on the measured relative bearing, the motor 136 can be activated to rotate the gun string 120 to the desired azimuthal orientation to perforate in an identified horizontal stress plane (the maximum stress plane). Thus, once the relative bearing of the tool string 120 in an interval is known, and the direction of the stress plane is known, then the tool string can be azimuthally oriented as a function of wellbore inclination. Such an orientation technique for a tool string can be successful in a wellbore having a slight deviation, e.g., as little as a fraction of 1°.

Alternatively, a gyroscope can also be added to the perforating gun string 120 so that the azimuthal orientation of the string 120 can be measured.

To protect the rest of the string 120 from the shock of the gun 142 firing, a shock absorber 140 may be connected between the gun 142 and the inclinometer sonde 138. In addition, a safety device 144 may be included in the string 120 to prevent or reduce likelihood of inadvertent activation of the gun 142. In a modification of the tool string in the FIG. 3 embodiment, the order of the components can be varied and some components may be omitted or substituted with other types of components.

Figure 4:
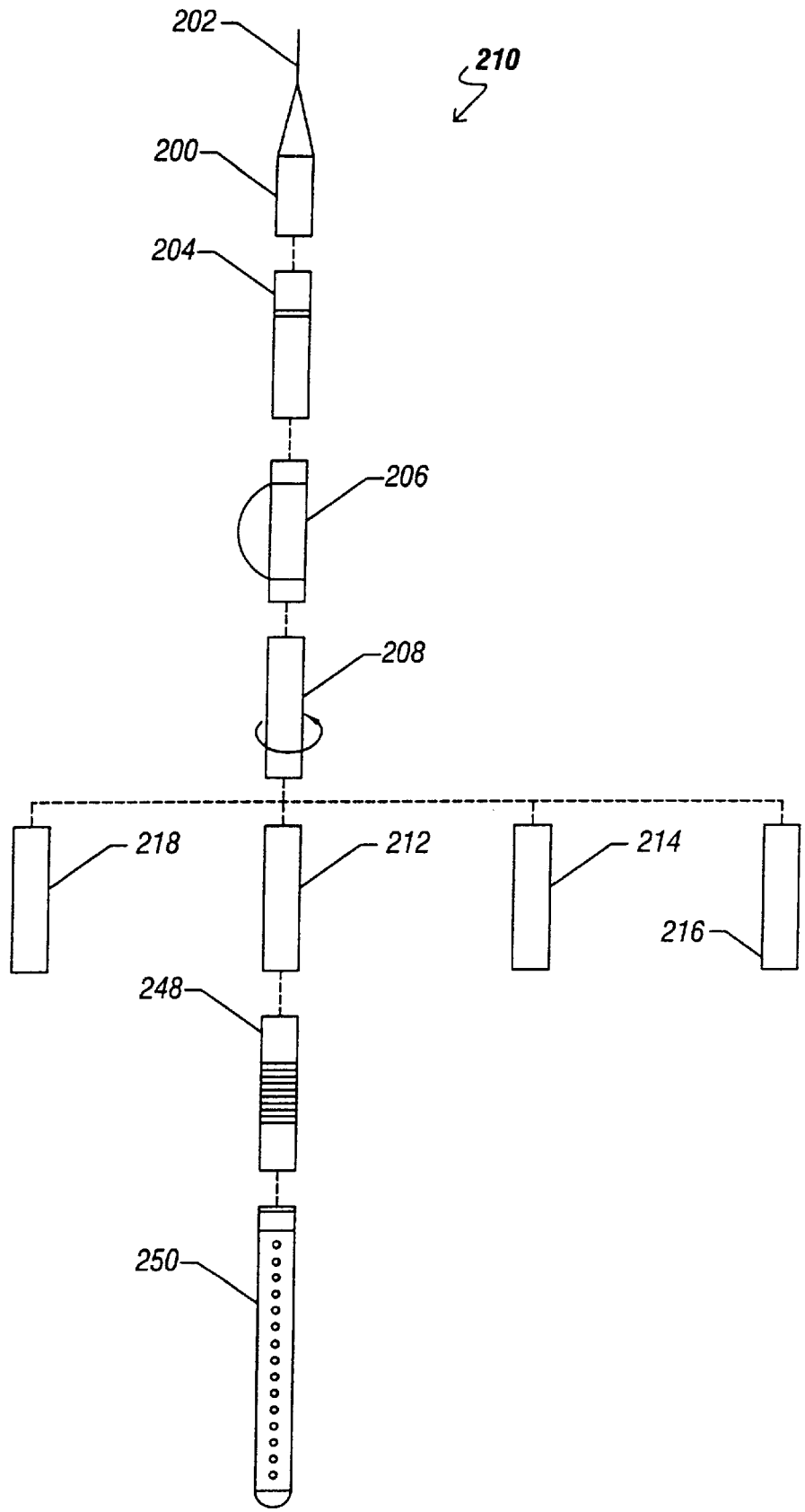
FIG. 4 is a diagram of a modular tool string according to a further embodiment that is capable of connecting to a number of different sondes.

Referring to FIG. 4, another embodiment of the invention includes a modular tool string 210 in which different measurement modules can be plugged into the string to aid in the performance of the desired orientation. The modules may include sondes that are plug-in compatible with the tool string. As with the embodiment of FIG. 3, the modular tool string 210 includes a motor 208 for rotating the gun 250 (or other downhole device) while an anchor 206 fixes a non-rotating portion of the string 210 to the casing 100.

One of the modular sondes may include an inclinometer sonde 218 that may be sufficient for use in a deviated wellbore 104 that has a deviation greater than a predetermined angle, e.g., about 1°. However, if the wellbore deviation is less than the predetermined angle, or it is otherwise desired that a more accurate orientation system be included with the string 210, then additional modular sondes may be added or substituted, including a gyroscope sonde 212. Another sonde that can be used is an electromagnetic flux sonde 214 that may include sensors such as Hall-effect sensors that are sensitive to flux variations to find a submersible pump cable so that the orientation of the tool string with respect to the known position of the submersible pump cable may be determined. The electromagnetic flux sonde 214 uses a electromagnetic field that is propagated about the tool semi-spherically and as the string 210 rotates (controlled by the motor 208) the flux field is affected by the mass of metal (e.g., completion equipment or components such as a submersible pump cable) around it. The measured data can be transmitted to the surface as the tool string 210 is lowered into the wellbore so that a map can be derived of what is downhole adjacent the perforating gun 250. The goal, depending on the specific application, may be to shoot away from or directly into a detected mass of equipment or components.

Another modular sonde that can be used is a focused gamma ray sonde 216. A radioactive source can be associated with one of the downhole component being protected or targeted whether it be another production string or pump or sensor cable. The tool string 210 is then lowered downhole. As the string 210 is rotated, the gamma ray sonde 216 can detect the position of the radioactive source.

Other embodiments are within the scope of the following claims. For example, although the components are described connected in a particular order, other orders are possible. The orientation techniques and mechanisms described can be applied to tool strings other than perforating strings. Additionally, the strings can be lowered downhole using other types of carriers, such as coiled tubing.

The Preferred Fluid Systems

The present invention relates to specialized techniques of propped hydraulic fracturing in which the perforations are shot in a plane aligned with the direction of probable fracture propagation, and thereafter a fracturing treatment is performed using a low viscosity fluid. One such suitable low viscosity fluid is water.

In particularly preferred embodiments of the present Invention, the low viscosity fracturing fluid is a viscoelastic surfactant-based fluid. These fluids are disclosed and claimed in numerous issued patents and patent applications assigned to Schlumberger: U.S. Pat. No. 4,790,958, Chemical Method of Ferric Ion Removal From Acid Solutions; U.S. Pat. No. 5,258, 137, Viscoelastic Surfactant Based Foam Fluids; U.S. Pat. No. 5,551,516, Hydraulic Fracturing Process and Composition; U.S. Pat. No. 5,964,295, Methods and Compositions for Testing Subterranean Formations; U.S. Pat. No. 5,979,557, Methods for Limiting the Inflow of Formation Water and for Stimulating Subterranean Formations; U.S. Pat. Appl. Ser. No. 09/166,658, Methods of Fracturing Subterranean Formations; U.S. Pat. Appl. Ser. No. 09/224,440, Fluids and Techniques for Hydrocarbon Well Completions; U.S. Pat. Appl. Ser. No. 09/219,948 Methods of Fracturing Subterranean Formations, U.S. Pat. Appl. Ser. No. 09/256,980, Methods for Fracturing Subterranean Formations; U.S. Pat. Appl. Ser. No. 09/240,125 Process for Hydraulically Fracturing Oil and Gas Wells Utilizing Coiled Tubing. Each of these U.S. patents and patent applications is hereby incorporated by reference in its entirety, into the present Application. Additional information relating to selected VES-based fluids claimed in the these patents/patent applications is found in the SPE article, Polymer-Free Fluids for Hydraulic Fracturing, SPE 38622 (1997).

An exemplar class of viscoelastic surfactants of the present Invention are quaternary ammonium chlorides, and in particular, those having the general formula:

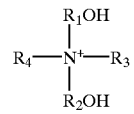

in which $R_1$ and $R_2$ are the same or different and are each short alkyl chains (i.e., from about two to about five carbon atoms in length), $R_3$ is an alkyl group of about one to four carbon atoms, and $R_4$ is a much longer alkyl chain, that is preferably unsubstituted. In particularly preferred embodiments, $R_4$ is about 20–24 carbon atoms, with a single double bond at the approximate midpoint in the alkyl chain.

In particularly preferred embodiments, a co-surfactant is added to the fracturing fluid, preferably an quaternary amine oxide of smaller chain length than the primary surfactant. The primary surfactant and co-surfactant are typically present in the fracturing fluid at about an 8 to 1 ratio, and both components comprise between about one and about six percent of the total fracturing fluid by eight.

In another preferred embodiment, fibrous materials such as PropNet, PropNet II, PropNET GOLD and PropNET hi k (trademarks of Schlumberger) are added to the fracturing fluid to stabilize the proppant or to avoid proppant flowback. Such materials are described in patents incorporated herein by reference and recited below which are disclosed as materials suitable to stabilize proppant or to avoid proppant flowback. Patents incorporated by reference include U.S. Pat. No. 5,782,300, Suspension and Porous Pack for Reduction of Particles in Subterranean Well Fluid and Methods for Treating an Underground Formation; U.S. Pat. No. 5,330, 005, Control of Particulate Flowback in Subterranean Wells; and U.S. Pat. application Ser. No. 09/216,420, Novel Fluids and Techniques for Maximizing Fracturing Fluid Clean-up. Such materials include but are not limited to novaloid fibers, novaloid platelets, natural organic fibers and/or platelets, synthetic organic fibers and/or platelets, ceramic fibers and/or platelets, inorganic fibers and/or platelets, metal fibers and/or filaments and/or platelets, carbon fibers and/or platelets, glass fibers and/or platelets, novoloid-type polymer fibers and/or platelets, natural polymer fibers and/or platelets, synthetic polymer fibers and/or platelets; and mixtures thereof.

EXAMPLE

Fracturing Treatment on a Low Permeability Gas Well in Elk City, Texas

A fracturing treatment based on the present Invention was performed in a very tight gas formation in the Texas panhandle region. The fluid was pumped through 5.5" OD (4.892" ID) casing (no treating iron). The zone of interest was at a measured depth (virtually equal to true vertical depth in this case) of 12,046 to 12,143 feet. Bottom hole static temperature was 210° F.

The zone of interest was ultra-low permeability sandstone (roughly 100 ft) having a permeability of 0.03 millidarcies, and a porosity that varied from 6.9 to 9.0%. The reservoir pressure was slightly under 5,100 psi. This zone was bounded on the top and bottom by shale.

The zone of interest had an average in situ stress of about 7,000 psi. Average Young's modulus, Poisson's ratio and formation toughness for the entire zone were estimated as 4.7×106, 0.22, and 1,200, respectively.

That the perforations were properly oriented in a single vertical plane was confirmed with USIT; that the plane was aligned in the direction of maximum in situ stress was confirmed by FMI and DSI measurements. The obvious redundancy in measurement was to ensure proper perforation alignment/orientation in accordance with the present Invention. The perforation shot density was 2.00 shots/ft; perforation size is 0.45" diameter.

The fracturing fluid was comprised of a 2.5% VES-based system, 35 gal/Mgal of sodium salicylate, and 3 gal/Mgal of a clay stabilizer The VES-based system was in turn comprised of a primary surfactant (60%); amine oxide co-surfactant (8%), isopropyl alcohol (24%), propylene glycol (5%), and 4% water. A total of 65,000 gallons of 2.5% ClearFrac (trademark of Schlumberger) fluid was used (not including 11,762 gallons of 0.5% as flush).

The primary surfactant was long-chained quaternary amine having the structure:

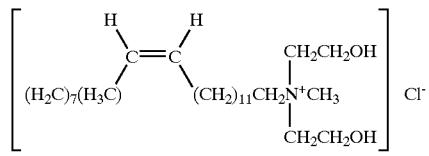

The co-surfactant was an amine oxide having the structure:

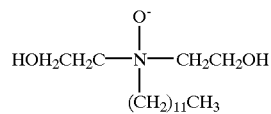

The proppant used was 20/40 Econoprop, an inexpensive, artificial ceramic proppant. This proppant had a specific gravity of 1.1, a mean diameter of 0.025", a pack porosity of 35%, and a permeability of 215,721 md. A total of 5 98,433 pounds was used in this treatment.

The treatment was performed according to the schedule presented in Table 1.

TABLE 1

| Stage Name | Fluid Type | Pump Rate (bbl/min) | Stage Fluid Volume (gal)/Stage Proppant (lbs) | Perforation Injection Temp. (° F.) | Exposure at BHST (210° F.) (min) | Exposure Above Watch Temp (150° F.) (min) |
|---|---|---|---|---|---|---|
| Pad | 2.5% ClearFrac | 50.0 | 23,000/0 | 84 | 10.6 | 12.9 |
| 1.0 PPA | 2.5% ClearFrac | 50.0 | 9,000/9,000 | 83 | 17.1 | 20.9 |
| 2.0 PPA | 2.5% ClearFrac | 50.0 | 10,000/20,000 | 83 | 6.7 | 16.4 |
| 3.0 PPA | 2.5% ClearFrac | 50.0 | 11,000/33,000 | 82 | 0.0 | 9.7 |
| 4.0 PPA | 2.5% ClearFrac | 50.0 | 12,000/48,000 | 83 | 0.0 | 0.7 |
| Flush | 2.5% ClearFrac | 50.0 | 11,762/0 | | | |

Based on a computer simulation using FracCADE™ (Schlumberger proprietary fracture design and treatment-monitoring software) the following parameters were obtained (or estimated): propped fracture half length=457.1 ft; end-of-job hydraulic height at well=122.7 ft; average propped width=0.110 in; average gel concentration=0.0 lb/Mgal; average fluid retained factor=1.00; average conductivity=1699 md ft; average Fcd=123.9; net pressure= 1624 psi; efficiency=0.242.

Prior modeling results (using FracCADE) indicated that if a conventional polymer-based fracturing fluid were used (e.g., borate-cross-linked guar or modified guar system) the fracture would migrate out of the zone of interest—indeed, substantially so, the modeling results predicted a fracture height of about 400 ft with this conventional system, whereas the producing zone is only about 100 feet. In fact, the actual fracture appears to have stayed in zone based on data obtained during performance of the treatment. Other than the present Invention (utilizing a viscoelastic surfactant based system such as ClearFrac), another possible alternative to avoid fracturing out of zone, is an uncross-linked system (i.e., a linear gel system). Our best estimates were that this system would have insufficient proppant-transport capabilities to deliver the desired proppant load into the fracture.

A second significant advantage of the present Invention compared with conventional fracturing treatments is that not only is fracture height optimized, but so is fracture length. Again, based on prior modeling results (and empirical observation from previous treatments) conventional polymer-based systems exhibit clean-up rates of about 50%—i.e., only about one-half of the fluid is actually recovered from the fracture after the treatment is performed. Since most of the retained fluid resides in the fracture tip, its effect is to reduce the effective fracture length. In the treatment described here, over 50% of the fluid pumped is recovered within a few days after the treatment, which indicates a much longer effective fracture length (or half length) compared with conventional systems.

Therefore, as evidenced by the data presented above—data obtained from an actual field treatment—treatments that embody the present Invention exhibit superior fracture effectiveness. Again, "effectiveness" is defined in this specific instance as an optimized height (sufficient height to improve production, but not out of zone) and length (due largely to superior clean up of viscoelastic surfactant based system).

Having thus described the Invention, what is claimed is:

1. A method for fracturing a subterranean formation in communication with the surface through a wellbore lined with casing, said method comprising:

determining the direction of maximum in situ stress within said formation; placing a perforating gun into said wellbore;

orienting said gun along a single vertical plane extending in the direction of maximum in situ stress;

actuating said gun to perforate said casing; and performing a propped fracturing treatment by injecting a low viscosity fluid into said wellbore and allowing it to enter said formation through said perforations, thereby creating or extending a fracture, wherein said low viscosity fluid has a viscosity below about 100 cp yet has sufficient viscosity to deliver a desired amount of proppant into said fracture, thereby controlling the fracture propagation.

2. The method of claim 1 Wherein said perforation gun is placed into said wellbore by means selected from the group consisting of wireline, slickline, or coiled tubing.

3. The method of claim 1 wherein said low viscosity fluid is a viscoelastic surfactant based fluid.

4. The method of claim 1 wherein said low viscosity fluid is delivered into said fracture through coiled tubing.

5. The method of claim 1 further comprising injecting into said wellbore, a fibrous material.

6. The method of claim 5 wherein said fibrous material is selected from the group consisting of novaloid fibers or platelets; natural organic fibers or platelets; synthetic organic fibers or platelets; ceramic fibers or platelets; inorganic fibers or platelets; metal fibers or filaments or platelets; carbon fibers or platelets; glass fibers or platelets; novoloid-type polymer fibers or platelets; natural polymer fibers or platelets; synthetic polymer fibers or platelets; and mixtures thereof.

7. The method of claim 1 wherein said low viscosity fluid is a viscoelastic surfactant based solution, wherein said surfactant is present in said fluid at between about 1.0 and 6.0%.

8. A method for fracturing a subterranean formation in communication with the surface through a wellbore lined with casing, said method comprising:
    determining the direction of maximum in situ stress within said formation;
    placing a pertorating gun into said wellbore;
    orienting said gun along a single vertical plane extending in the direction of maximum in situ stress;
    actuating said gun to perforate said casing; and
    performing a propped fracturing treatment by injecting a low viscosity fluid into said wellbore and allowing it to enter said formation through said perforations, thereby creating or extending a fracture, wherein said low viscosity fluid has a viscosity below about 100 cp yet has sufficient viscosity to deliver a desired amount of proppant into said fracture, and said low viscosity fluid is a viscoelastic surfactant based solution, wherein said surfactant is present in said fluid at between about 1.0 and 6.0%, said fluid comprised of a primary surfactant and a co-surfactant, wherein said primary surfactant is

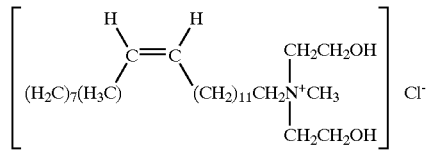

and said co-surfactant is

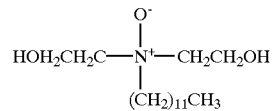

wherein said primary surfactant and said co-surfactant are present in said fluid in an approximately 8 to 1 ratio.

9. A method for fracturing a hydrocarbon-bearing formation comprising the steps of:
    shooting perforations in a wellbore casing, said perforations substantially aligned in the direction of maximum in situ stress by means of an apparatus in turn comprising a measurement device adapted to measure the azimuthal orientation of a perforating gun, a positioning device adapted to position said gun as it is lowered into said wellbore, wherein the positioning device allows said gun to self-orient once said gun reaches a formation zone of interest, and further wherein said measurement device is adapted to measure the azimuthal orientation of said tool once said tool has been positioned in said zone; thereafter
    pumping into said formation a viscoelastic surfactant based fracturing fluid, having a viscosity below about 100 cp yet has sufficient viscosity to deliver a desired amount of proppant into said fracture at a pressure that exceeds the minimum in situ rock stress.

10. The method of claim 9 wherein said positioning device is adapted to prevent free rotation of said gun as said gun is lowered into said wellbore.

11. The method of claim 9 wherein said positioning device is weighted on one lateral side to an extent sufficient to cause said weighted side tend towards a lower wall of said wellbore.

12. The method of claim 9 wherein said positioning device includes a weighted spring.

13. The method of claim 9 wherein said measuring device includes a gyroscope.

14. The method of claim 9 wherein said apparatus further comprises an inclinometer sonde to measure a relative bearing of said gun in said wellbore.

15. The method of claim 9 wherein said apparatus is deployed by means selected from the group consisting of wireline, slickline, and coiled tubing.

16. A method for creating an efficient fracture in a very low permeability formation, comprising
    shooting perforations in a wellbore casing, said perforations substantially aligned in the direction of maximum in situ stress by means of an apparatus in turn comprising a measurement device adapted to measure the azimuthal orientation of a perforating gun, a positioning device adapted to position said gun as it is lowered into said wellbore, wherein the positioning device allows said gun to self-orient once said gun reaches a formation zone of interest, and further wherein said measurement device is adapted to measure the azimuthal orientation of said tool once said tool has been positioned in said zone; thereafter
    pumping into said formation a low viscosity fluid at a pressure that exceeds the minimum in situ rock stress, wherein said low viscosity fluid has a viscosity of less than about 100 cp at 170 sec$^{-1}$, yet sufficient viscosity to deliver an amount of proppant into said fracture sufficient to maintain a desired fracture geometry.

17. The method of claim 16 wherein said low viscosity fluid is a surfactant-based system.

18. The method of claim 16 wherein said low viscosity fluid is a viscoelastic surfactant-based fluid.

19. The method of claim 16 wherein said low viscosity fluid is consists essentially of an approximately 1.0% to about 6% mixture of a primary surfactant and a co-surfactant, wherein said primary surfactant is a quaternary ammonium chloride and wherein said co-surfactant is an amine oxide.

20. The method of claim 19 wherein said primary surfactant has the general structure

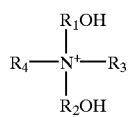

wherein $R_1$ and $R_2$ are the same or different and are each alkyl groups of between one and four carbon atoms; wherein $R_3$ is an alkyl group of between one and four carbon atoms, and wherein $R_4$ is a partially unsubstituted alkyl group of between about 15 and about 24 carbon atoms;

and wherein said co-surfactant has the general structure:

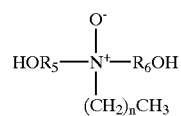

wherein $R_5$ and $R_6$ are the same or different and are each alkyl groups of between one and four carbon atoms; and wherein n is between seven and thirteen.

* * * * *